United States Patent [19]
Yang

[11] Patent Number: 5,631,794
[45] Date of Patent: May 20, 1997

[54] DIFFERENTIAL SHUNT-TYPE PROTECTION CIRCUIT

[76] Inventor: Tai-Her Yang, No. 32 Lane 29, Taipin St., Si-Hu Town Dzan-Hwa, Taiwan

[21] Appl. No.: 317,596

[22] Filed: Oct. 3, 1994

[51] Int. Cl.⁶ .................................................... H02H 3/26
[52] U.S. Cl. ........................... 361/60; 361/10; 361/58; 337/100
[58] Field of Search .................... 361/56–60, 104, 361/160–162, 8–9, 10, 21, 58, 32–34, 103; 337/27–28, 14, 15–16, 97, 100–101, 125; 338/22 R, 23; 323/231; 327/326, 512, 583, 584

[56] References Cited

U.S. PATENT DOCUMENTS 3,829,717  8/1974  Harrison .................................. 307/297
4,847,719  7/1989  Cook et al. ............................. 361/13

*Primary Examiner*—Jeffrey A. Gaffin
*Assistant Examiner*—Michael Sherry
*Attorney, Agent, or Firm*—Bacon & Thomas

[57] ABSTRACT

A differential shunt-type detector circuit includes a voltage-regulator component series combined with one or more than one shunt components in a circuit connected in parallel with, for example, a thermostatic switch element, such that when the terminal voltage of the shunt components is within the voltage-regulator component work range, no shunt or distribution or shunting effect is generated by the voltage-regulator component, while when the terminal voltage exceeds the voltage-regulator component work range, a shunt or distribution effect is obtained.

3 Claims, 1 Drawing Sheet

– 5,631,794 –

DIFFERENTIAL SHUNT-TYPE PROTECTION CIRCUIT

SUMMARY OF THE INVENTION

A differential shunt-type detector circuit of the type in which shunting occurs only above a certain voltage replaces conventional parallel connected voltage distribution or shunt circuits used for sample detection or protection, for example in connection with a thermostatic protection circuit. The preferred circuit includes a voltage-regulator component series combined with one or more than one shunt components in a parallel distribution circuit, such that when the terminal voltage of the shunt components are within the voltage-regulator component work range, no distribution effect is generated by the voltage-regulator component, while when the terminal voltage exceeds the voltage-regulator component work range, a distribution effect is obtained.

DETAILED DESCRIPTION OF THE INVENTION

Figure 1:
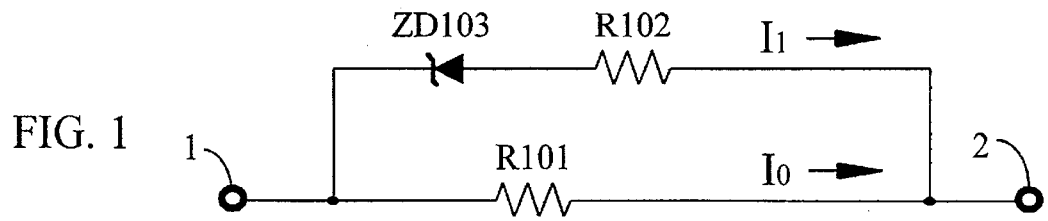
FIG. 1 is a schematic diagram illustrating the basic principles of the invention.
Figure 3:
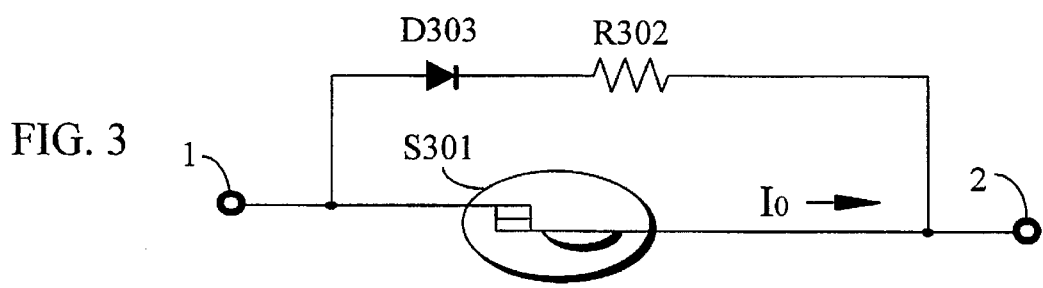
FIG. 3 is a schematic circuit diagram of a specific application of the invention to a thermostatic protection circuit.
Figure 4:
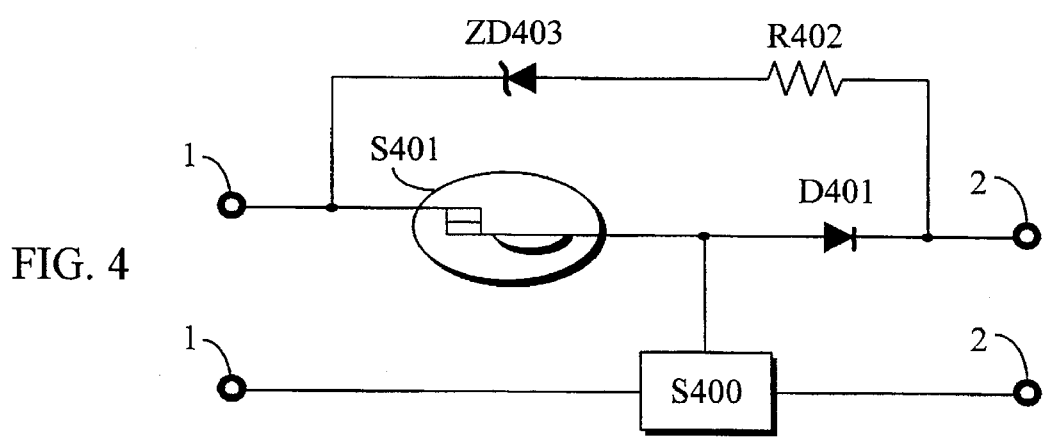
FIG. 4 is a schematic circuit diagram of a specific application of the invention to a relay circuit for controlling detecting components.

In each of FIGS. 1, 3, and 4, reference numerals 1 and 2 have been used to designate respective input/output terminals through which the circuits illustrated therein are connected to other circuits.

Figure 2:
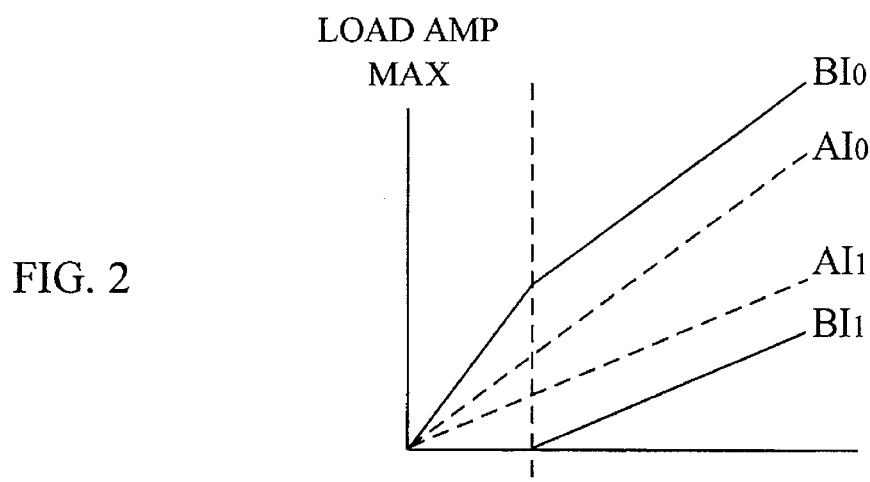
FIG. 2 is a graph of the operating characteristics of the invention.

FIG. 1 illustrates the basic principles of the preferred differential shunt-type detection circuit which is chiefly comprises of the following:

A main resistance element R101 made up of one or more resistors, inductors with resistive impedance, or thermostatic switches with resistive impedance;

A shunt resistance element R102 made up of one or more than one resistor, inductors with resistive impedance, or thermostatic switches with resistive impedance, connected first in series with a voltage-regulator component ZD103 and then in parallel with the main resistance element R101;

A voltage-regulator component ZD103 made up of a zener diode with zener characteristics or diodes having the same polarity and arranged to provide zener characteristics, electro-mechanical voltage regulating relays for one directional or bi-directional electricity conduction or diodes and/or relays further connected to drive electro-mechanical or solid state switching components thereby to enlarge their power capacities, The work characteristic diagram of the differential shunt-type detection circuit is different from the conventional direct parallel distribution circuit as shown in FIG. 2, wherein curves $AI_0$ and $AI_1$ present proportional change characteristics of the conventional direct proportional distribution circuits; while curves $BI_0$ and $BI_1$ represent the operating characteristics of the preferred differential shunt-type detection circuit.

The preferred differential shunt-type detection circuit can be widely applied in power circuits and in general signal sampling circuits, with examples of power circuits being shown in FIGS. 3 and 4.

FIG. 3 shows an embodiment of the invention in the form of a thermostatic protection circuit in which the main resistance element is constituted by the internal double metals of the thermostatic switch S301 and the contact resistance at the contact points, the shunt resistance element R302 is an overload current-limiting resistor, and the diode D303 is series combined with the shunt resistor R302. The forward bias voltage VF of the diode D303 is used as a voltage limit value to generate intermittent loading current limitations for protecting the relevant components from overheating when the current $I_0$ is abnormally increased, the functions of this circuit include the following:

When the terminal voltage across the thermostatic switch S301 is lower than the forward bias voltage VF of the diode D303, the current flowing through the thermostatic switch S301 of the current $I_0$ flows exclusively through the thermostatic switch S301;

When the current $I_0$ is increased so that the terminal voltage across the thermostatic switch S301 is higher than the forward bias voltage VF of the diode D303, then the shunt resistor starts to generate a distribution effect;

When the current $I_0$ is increased so that the thermostatic switch S301 is tripped to the OFF state, then the shunt resistor R302 serves as the load current-limiting resistor until the thermostatic switch S301 has cooled down sufficiently to recover and close again.

In this example, if the temperature-lowering recovery characteristic of the circuit thermostatic switch is to be extended or sustained at the overload open-circuit status, then the shunt resistor R302 can be further arranged such that the thermostatic switch is heated by the shunt resistor R302 to extend the temperature-lowering recovery time, or the thermostatic switch is kept heated by the heat of the shunt resistor R302 to maintain the thermostatic switch S301 at the open-circuit status.

The preferred differential voltage detection circuit can be further applied as a relay control using the detector components shown in FIG. 4. The relay application is characterized in that the voltage-regulator component ZD403 is series combined with the shunt resistor R402 to form the distribution circuit, while the thermostatic switch S401 is first forward series combined with the diode D401 and is further parallel combined with the distribution circuit to provide the required distributing detector characteristic. The series connecting point between the thermostatic switch S401 and the diode D401 is used as the relay control point to provide a control current to the power switch S400, and when the thermostatic switch is open due to overload, the control current to power switch S400 is cut off at the same time, after which the power switch S400 is free to further perform switching control on power type loads.

In summary, the preferred differential shunt or voltage distribution circuit sets a differential voltage to provide a multiple stage signal response in a simplified manner. Therefore this invention is original and useful, wherefore the application have found not relevant disclosures in the prior arts, and your approval of the claims according to law is greatly appreciated.

I claim:

1. In a circuit comprising a thermostatic switch element and shunt components, wherein the shunt components are connected in parallel with the thermostatic switch element and include at least one shunt resistance element and a voltage-regulator component, the improvement wherein the voltage regulator component forms a means for preventing shunting of current through said resistance element until a terminal voltage across the voltage regulator component exceeds a set point of the voltage regulator component, wherein the resistance element forms a means for shunting the current when the set point is exceeded, and wherein a control input of a power switch is connected between the thermostatic switch and a diode such that the power switch is controlled according to a state of the thermostatic switch.

2. A circuit as claimed in claim 1, wherein the voltage regulator component is a zener diode.

3. A circuit as claimed in claim 1, wherein the voltage regulator component is a diode and the shunt resistance element is an overload limiting resistor.

* * * * *